US010915330B2

(12) United States Patent
Mehra et al.

(10) Patent No.: US 10,915,330 B2
(45) Date of Patent: Feb. 9, 2021

(54) PSEUDO-RANDOM LOGICAL TO PHYSICAL CORE ASSIGNMENT AT BOOT FOR AGE AVERAGING

(71) Applicant: ADVANCED MICRO DEVICES, INC., Santa Clara, CA (US)

(72) Inventors: Amitabh Mehra, Fort Collins, CO (US); Krishna Sai Bernucho, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 282 days.

(21) Appl. No.: 15/846,781

(22) Filed: Dec. 19, 2017

(65) Prior Publication Data

US 2019/0188001 A1 Jun. 20, 2019

(51) Int. Cl.
*G06F 9/4401* (2018.01)

(52) U.S. Cl.
CPC .......... *G06F 9/4408* (2013.01); *G06F 9/4403* (2013.01)

(58) Field of Classification Search
CPC .................................................. G06F 9/4408
See application file for complete search history.

(56) References Cited

U.S. PATENT DOCUMENTS

| 2003/0093695 | A1* | 5/2003 | Dutta ................... G06Q 20/045 726/4 |
| 2008/0162878 | A1 | 7/2008 | Zimmer et al. |
| 2010/0107166 | A1 | 4/2010 | Topaloglu |
| 2014/0006767 | A1 | 1/2014 | Chang et al. |
| 2015/0169363 | A1* | 6/2015 | Anderson ............. G06F 9/4893 718/103 |
| 2017/0068546 | A1 | 3/2017 | Henry et al. |
| 2017/0277571 | A1 | 9/2017 | Yoo et al. |

OTHER PUBLICATIONS

International Search Report and Written Opinion dated Jan. 15, 2019 for corresponding International Application No. PCT/US2018/052456, 17 pages.
International Preliminary Report on Patentability dated Jul. 2, 2020 for International Application No. PCT/US2018/052456, 13 pages.

* cited by examiner

*Primary Examiner* — Kim Huynh
*Assistant Examiner* — Eric Chang

(57) ABSTRACT

A computing device includes a processor having a plurality of cores, a core translation component, and a core assignment component. The core translation component provides a set of registers, one register for each core of the multiple processor cores. The core assignment component includes components to provide a core index to each of the registers of the core translation component according to a core assignment scheme during processor initialization. Process instructions from an operating system are transferred to a respective core based on the core indices.

15 Claims, 6 Drawing Sheets

PSEUDO-RANDOM LOGICAL TO PHYSICAL CORE ASSIGNMENT AT BOOT FOR AGE AVERAGING

BACKGROUND

In a conventional processing system having a processor with multiple cores, one core is designated as the default core for implementing the boot process for the processing system and for remaining in an active state to handle various tasks while the other cores of the processor are in a reduced-power state. This default core assignment is static and permanent across boot processes and state changes. The core permanently designated as this default core thus is subjected to an unequal share of the computing workload of the processor. As a result, the operating life of the default core is reduced relative to the other cores, and once the default core is no longer operational within minimum specifications, the entire processor typically is scrapped or discarded.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Typically, an operating system (OS) of a computing device logically enumerates the cores of a multi-core processor according to pin number, with the core at a first pin position or number being numbered C(0) (or "C0") by the operating system as a default core for handling processes assigned for execution by the processor. This assignment is maintained as long as the operating system remains active, which often is for weeks or even months between re-starts or boot-ups. Further, when computing demand is reduced, one or more of the cores of the multi-core processor are placed into a reduced power state, while the default core C(0) is maintained in an active state (or a more active state) so that at least one core is available to accept processes for execution. Thus, even when idle, the OS generally tends to favor assigning execution of processes to the default core C(0). However, between the assignment of boot tasks, low-level kernel tasks, and user space program processes to the default core C(0), the default core C(0) wears out sooner than the other cores, especially when the other cores of the processor are frequently set to an idle state or a power-down state. As such, without evenly spreading the workload to all of the cores of the processor, the operating life of the processor is reduced because the default core C(0) wears out. Once one core fails or wears out, the processor (and perhaps the device implementing the processor) is rendered non-operational since the processor typically is not designed to operate without all cores of the processor remaining viable for accepting process tasks from the OS.

Therefore, according to some embodiments, during a bootstrap process a computing device implementing a processor with multiple processor cores is configured to non-permanently select one core of the plurality of cores as the default core for process execution so that the computing device and OS do not default to always assigning the same core as the default core. The other cores are assigned based on this selection. The assignment of the default core C(0) is performed according to one of a plurality of techniques as further described. As this selection of one core as the default core is temporary, the computing device is able to dynamically re-assign a different core as the default core C(0) at some point after the boot process. As a result, the responsibility for operating as the default core C(0) is more evenly spread among the cores of the processor. This more evenly spreads the wear on the cores and thus extends the operational life of the processor.

Figure 1:
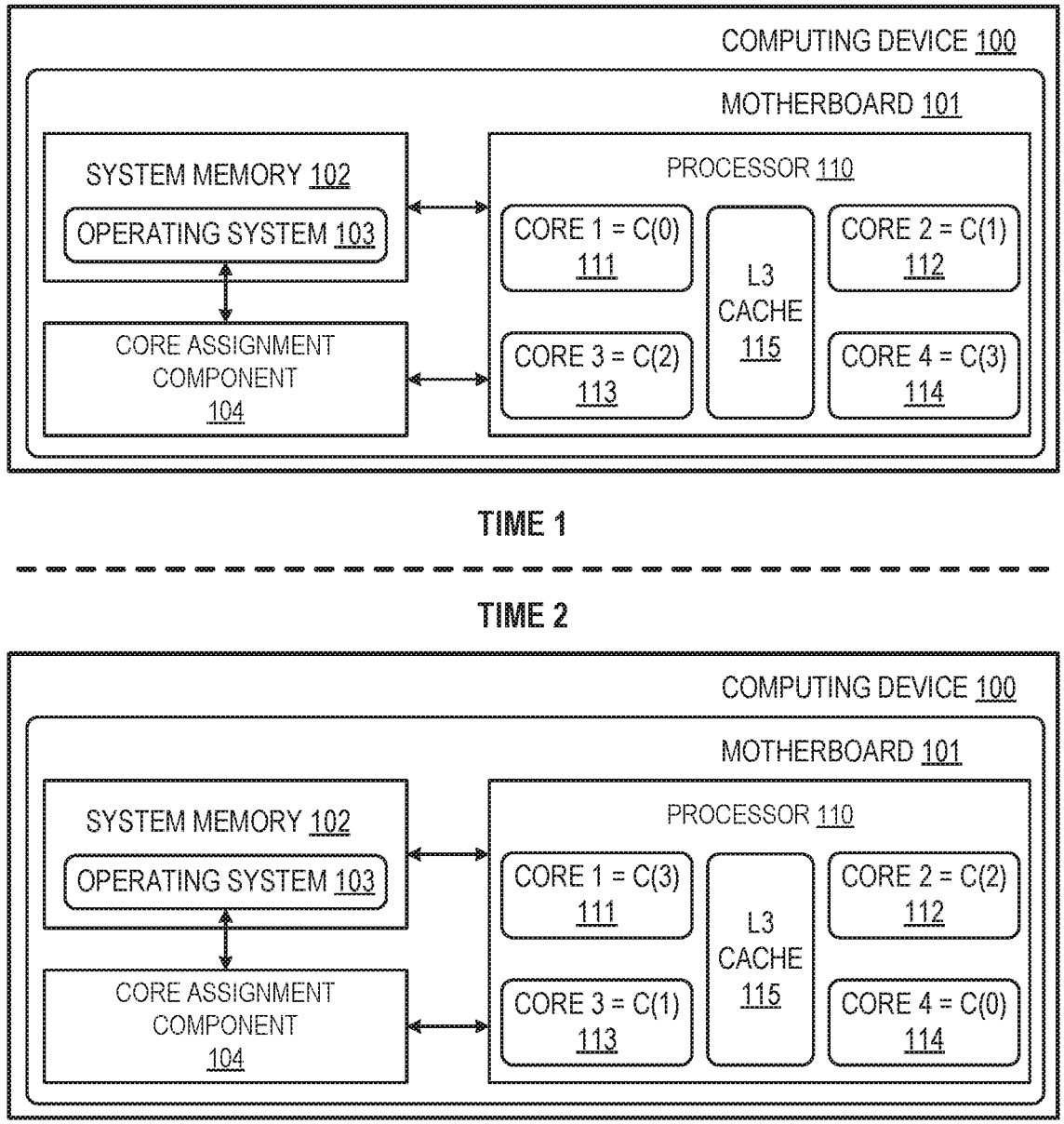
FIG. 1 is a block diagram of a computing device having a multiple-core processor with a dynamically-assigned default core according to some embodiments.

FIG. 1 is a block diagram of a computing device having a multiple-core processor at two different times where core assignments have been reassigned between a first time and a second time according to some embodiments. For example, these two times are after two executions of a boot process. A computing device 100 includes a motherboard 101 that provides power and support to at least a system memory 102 and a multi-core processor 110. The processor 110 includes four cores 111-114 arranged adjacent to an L3 cache of memory 115. An OS 103 in a system memory 102 has become active through the boot process.

At a first time ("TIME 1"), a core assignment component 104 operative in the device 100 has assigned or designated a first core ("CORE 1") 111 in the upper-left as the default core C(0) to the OS 103—where core indices are numbered starting from zero. A second core ("CORE 2") 112 has been assigned to be a second core C(1). A third core ("CORE 3") 113 has been assigned to be a third core C(2). A fourth core ("CORE 4") 114 has been assigned to be a fourth core C(3). At a second time ("TIME 2") previous or subsequent to the first time, the cores 111-114 have been assigned differently by one or more components of the computing device 100 such as the core assignment component 104 according to some embodiments. The same physical cores have remained in their same physical places in the processor 110. However, the core assignments have changed. At the second time, the cores 111-114 are designated as C(3), C(2), C(1), and C(0), respectively.

According to some embodiments, the fourth core 114 has been selected at random and designated as the default core C(0), and the remaining cores are designated according to pin order in the processor 110 as encountered during the boot process. Other embodiments assign core designations by other methods. For example, according to other embodiments, the third core 113 and the fourth core 114 have been selected at random and designated as the second core C(1) and the default core C(0), respectively, and the remaining cores are designated according to pin order in the processor 110 as encountered during the boot process. In yet other embodiments, the second, third, and fourth cores 112-114 have been selected at random and designated as the third core C(2), the second core C(1), and the default core C(0), respectively, and the remaining core is designated according to pin order in the processor 110 as encountered during the boot process. Further examples of embodiments and further illustrative details are provided herein in relation to other figures.

Irrespective of whether the computing device 100 is operating at the first time or the second time, the OS 103 sends process instructions to cores 111-114 according to core indices. For example, process instructions passed from the OS 103 to the processor 110 is done according to an index (e.g., 1 in hexadecimal notation corresponding to either the second core 112 or the third core 113) and a hardware identifier (e.g., HID=LNXCPU:00 corresponding to the processor 110). Thus, when a reference to a process of the OS 103 needs to be passed from the system memory 102 to the processor 110 so that process instructions can be executed, the mechanism involves the core index. The core index allows the device 100 to deliver processor instructions to the proper core without the OS 103 passing a specific pin number of the processor 110 in relation to the motherboard 101. Consequently, the OS 103 can be written, compiled, and operated across a variety of types of processors without a need to change the operating system for every hardware change across various devices. Various embodiments are now described as examples of how to assign processor core indices for use by an OS such as OS 103.

Figure 2:
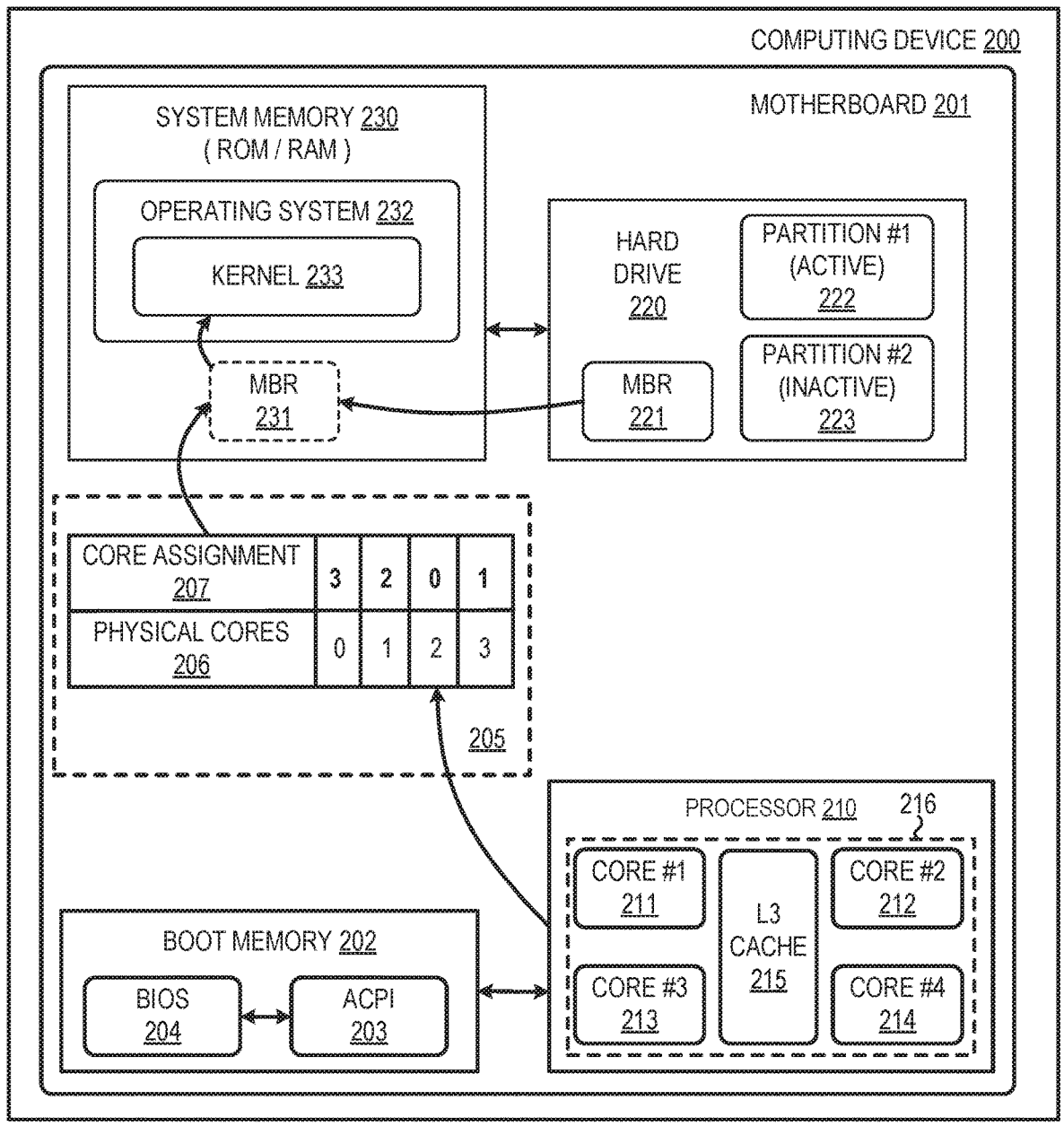
FIG. 2 is a block diagram of a computing device having a multiple-core processor with rotating default core assignment according to some embodiments.

FIG. 2 is a block diagram of a computing device 200 having a multiple-core processor with rotating default core assignment according to some embodiments. The computing device 200 includes, for example, a desktop computer, a notebook computer, a server, a tablet computer, a gaming console, or a mobile phone. The computing device 200 includes a motherboard 201 for operating various hardware elements, including a boot memory 202, a multi-core processor 210, a hard drive 220 or other storage device, and a system memory 230. According to some embodiments, the system memory 230 includes a read only memory (ROM) or a random access memory (RAM).

The processor 210 includes a plurality of cores including a first core 211, a second core 212, a third core 213, and a fourth core 214. These cores include, for example, central processing unit (CPU) cores, graphics processing unit (GPU) cores, or combinations thereof. According to some embodiments, the cores 211-214 include their own respective memory structures, such as an L1 cache and L2 cache which are not depicted in FIG. 2 for ease of illustration. The cores 211-214 also share an L3 cache 215. The cores 211-214 and associated caches form a cluster 216 of cores. The processor 210 can have other clusters of cores. According to some embodiments, the cores 211-214 are physical cores that are capable of supporting hyper-threading such that each of the cores 211-214 provide two "cores" or processors to the OS 232 for accepting processor instructions. In such case, a number of cores in the processor 210 would be eight for a purpose of selecting a default core C(0). Further, according to some embodiments, the cores 211-214 can be individually placed into a low power state or idle state without affecting the powered state of the other cores. The cluster 216 also can be placed into a lower power or idle state thereby placing the cores 211-214 into a low power state and allowing the device 200 to assign processes to other available (powered up) cores of the processor 210.

According to some embodiments, the boot memory 202 is implemented as a ROM that stores boot code for execution during a boot process that is initiated upon a motherboard power-on reset. The boot memory 202 includes a start-up service such as an advanced configuration and power interface (ACPI) framework 203 and a basic input output system (BIOS) 204. The ACPI framework 203 provides hardware registers to the components powered by the motherboard 201 to enable power management and device operation without directly calling each component natively such as by a hardware address. The ACPI framework 203 serves as an interface layer between the BIOS 204 and an OS 232 for the device 200.

At a power-on reset or other boot initialization event, power is supplied to the motherboard 201. When the motherboard 201 first receives power, the boot memory 202 is activated and completes its setup, initialization, and self-tests including a power-on self-test (POST). The BIOS 204 then uses information obtained during firmware initialization to create or update tables of the ACPI framework 203 with various platform and device configurations including power interface data. During the boot process, the processor 210 generates core information 205, which provides data about the cores 211-214 to the OS 232. In particular, the core information 205 includes a designation of one of the cores 211-214 as the default core C(0), and with the default core C(0) so designated, enumeration of the other cores as C(1) to C(N−1) accordingly.

During the boot process, the BIOS 204 identifies all available storage devices for potential boot devices that may have an OS for the device 200. The BIOS 204 uses a boot order specified in a persistent storage available to the motherboard 201. On some motherboards, the persistent storage is a separate chip. In many instances, the BIOS persistent storage is integrated with a real-time clock (RTC) or with an integrated circuit (IC) on the motherboard 201 that is responsible for a hard drive controller, an I/O controller, and integrated components. In some embodiments, the BIOS persistent storage is provided with its own power source in the form of a battery which allows the BIOS persistent storage to maintain the boot order, the core assignments 207, and so forth even if the motherboard 201 of the device 200 loses primary power.

The BIOS 204 looks for an OS to load in the first sector of each storage device in a boot order sequence. In FIG. 2, the BIOS 204 identifies the hard drive 220 as a potential boot device. The first sector stores at least one of two items: a master boot record (MBR) 221, or a volume boot record (VBR) if there are multiple partitions in the hard drive 220. The BIOS 204 copies the MBR 221 into the system memory 230. The copied MBR 231 is configured to point to an active partition 222 where an OS is located. The hard drive 220 may include one or more other inactive partitions such as the second partition 223 where programs and program data may be located.

The copied MBR 231 includes a boot loader for the OS 232. The boot loader includes executable code that loads the OS 232 into the system memory 230 and starts the OS 232. At this point, the BIOS 204 activates the boot loader and stops controlling the motherboard 201 and the device 200. The boot loader loads and executes the various components of the OS 232 in the system memory 230. During its initialization, the OS 232 starts and initializes a kernel 233 to allow the kernel 233 to provide tasks in the form of processor instructions to the processor cores 211-214. The kernel 233 manages execution of processes on the cores 211-214. During initialization, the kernel 233 is configured to access the cores 211-214 by way of reference indices corresponding to the core assignments 207. According to some embodiments, the core assignments 207 are implemented as a group of registers or a table of the ACPI framework 203, the kernel 233 operating according to conventional practices. In other embodiments, the core assignments 207 are provided to the kernel 233 by the boot loader of the MBR 231, and the kernel 233 uses the new core assignments 207 to effectively shift the default core designation of C(0) to one of the second core 212, the third core 213, or the fourth core 214. In yet other embodiments, the processor 210 provides the core assignments 207 to either the boot loader, or to the kernel 233 during initialization of the OS 232. According to further embodiments, after the boot process, during operation of the OS 232, the core assignments 207 are updated to new index values periodically or upon demand in order to spread the wear across the cores 211-214 during the life of the processor 210. After being re-assigned, the various processor cores 211-214 are assigned processes according to the new core assignments.

According to some embodiments, when the OS schedules a process for execution at a core 211-214, the OS refers to the cores 211-214 by an affinity mask. The affinity mask is a set of N bits, one for each of the N cores of the processor 210 in the device 200. The core information 205 translates for the OS 232 the physical core 211-214 that actually receives the task or thread of the particular process scheduled for execution.

Figure 3:
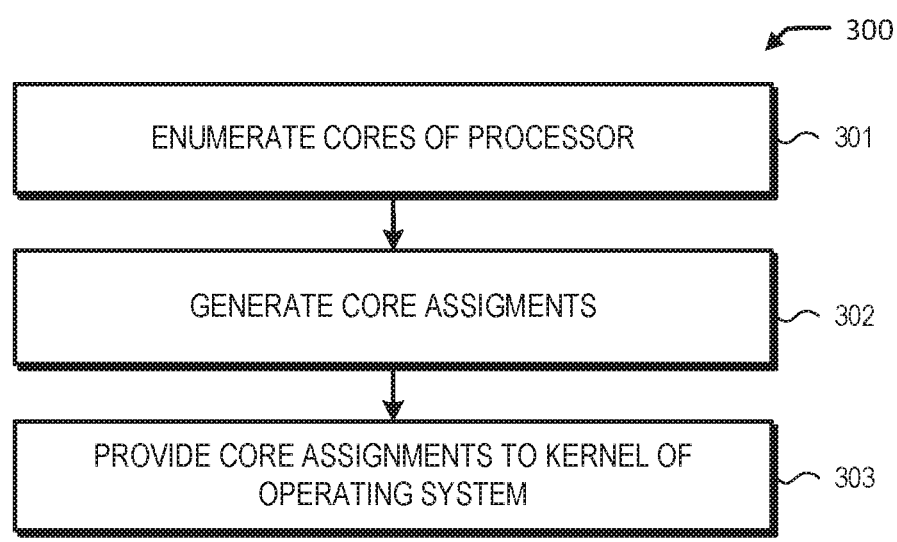
FIG. 3 is a flow diagram illustrating a method for assigning logical cores of a multi-core processor to an operating system in accordance with some embodiments.

FIG. 3 is a flow diagram illustrating a method 300 for assigning a logical core to an operating system in accordance with some embodiments. At block 301, cores of a processor are enumerated such as part of a CPU initialization step during a start-up or boot process. At block 302, core assignments are generated to change a physical enumeration of each core to an assigned enumeration of each core. At block 303, core assignments are provided to a kernel of an OS such as the kernel 233 of the OS 232 of FIG. 2.

According to some embodiments, core assignments are provided to the OS by making available indices by persistently storing the indices in a hardware component of a boot memory. One example hardware component is a nonvolatile complementary metal-oxide-semiconductor (CMOS) memory of the boot memory 202 of FIG. 2. For example, a current set of core indices are stored in the boot memory 202, and the core indices are thereby made available to the kernel 233 of the OS 232 in the CMOS memory. As another example, a current set of core indices are stored in a table, both the indices and the table being generated by ACPI Machine Language (AML) byte code that is executed during start-up of the ACPI framework 203 of FIG. 2 as known to those in the art. As needed, in order to rotate the core assignments 207 from time to time, the current set of core indices are re-arranged and made available to the kernel 233 of the OS 232. Rearranging the core indices distributes core wear such that the cores 211-214 of a multi-core processor 210 wear out more evenly over time than previously possible as an OS operates a device.

Figure 4:
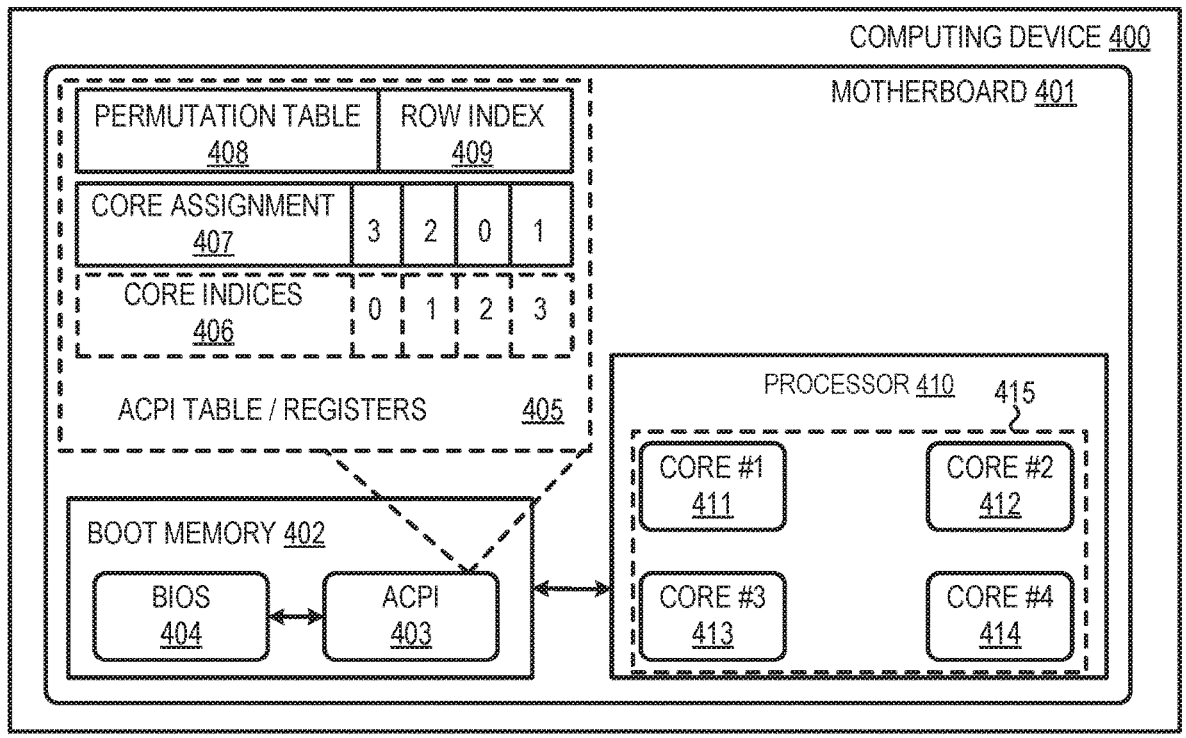
FIG. 4 is a block diagram of a computing device with a multi-core processor in which the cores are designated by way of advanced configuration and power interface (ACPI) persistent memory according to some embodiments.

FIG. 4 is a block diagram of a computing device with a multi-core processor in which the cores are designated by way of a persistent boot memory such as an advanced configuration and power interface (ACPI) persistent memory according to some embodiments. A computing device 400 includes a motherboard 401 for operating various hardware elements. Some elements of a general processing device are omitted from FIG. 4 for sake of ease in illustration such as a system memory (e.g., ROM) and a hard drive. The motherboard 401 operates a boot memory 402, and a multi-core processor 410. The boot memory 402 includes a persistent boot memory such as an ACPI persistent memory or a BIOS CMOS memory. According to some embodiments, the processor 410 is a CPU and includes a plurality of cores including a first core 411, a second core 412, a third core 413, and a fourth core 414. According to some embodiments, the cores 411-414 include their own respective memory structures and may share a shared memory (e.g., an L3 cache) where such memory structures are not depicted in FIG. 4 for sake of ease in illustration. The cores 411-414 form a cluster 415 of cores. The processor 410 can have other clusters of cores.

The boot memory 402 includes an ACPI framework 403 and a BIOS 404 that allows an OS of the computing device 400 to use the processor 410 by scheduling processing instructions to be executed thereon. The ACPI framework 403 includes an ACPI persistent memory that can store values for operation of the components of the computing device 400. According to some embodiments, an ACPI persistent memory takes the form of an ACPI table, a group of ACPI registers, or a set of ACPI registers 405 as known to those in the art. The processor 410 is declared in an ACPI namespace of the ACPI framework 403. Generally, the ACPI namespace includes ACPI tables for operating the components of the motherboard 401 including the processor 410. During its initialization, an OS of the computing device 400 builds a namespace for itself from the ACPI tables. A device definition for the processor 410 is declared in the OS of the computing device 400 using a hardware identifier which the OS uses to schedule processes to execute on the cores 411-414 of the processor 410.

The OS uses the set of registers 405 to schedule processes on the processor 410. The ACPI framework 403 includes registers for each of the cores 411-414 of the processor 410 in the form of core assignments 407. According to some embodiments, the core assignments 407 correspond to bus numbers (e.g., 0x4C, 0x10) for the cores 411-414, but are represented as indices in FIG. 4 for convenience. As the OS operates and executes processes, a kernel of the OS schedules the processes based on its conventional core indices 0 to N−1. The indices of an OS scheduler of the kernel of the OS correspond to the core indices 406 in FIG. 4 (e.g., execute process having PID 0123 execute on core (2) of processor having processor index (0)). However, as part of a configurable interface between the OS and processor 410, the core assignments 407 allow scheduled processes to be passed to the cores 411-414 according to the contents of the registers 405—specifically the core assignments 407. For example, a process that is scheduled by the OS to be executed at core index (0) at 406 (i.e., the default core C(0)) is actually passed to the physical core having index (3) at 407 (i.e., C(3), the fourth core 414). In this way, the first core 411 that was originally and permanently hardwired or configured as the default core C(0) in a conventional system has been transformed into the fourth core C(3), and the process that was assigned to be executed on the default core C(0) (from the perspective of the OS) is actually sent to C(3). This scheduling is repeated using the core assignments 407 until the core assignments 407 are re-generated. From the perspective of the OS scheduler, the process is executed on the default core C(0), and in actuality, the process is transparently passed to and executed on the fourth core C(3) 414. Thus, processes are passed to the respective cores 411-414 corresponding to the indices of the core assignments 407 thereby creating a configurable interface between the OS and the processor cores 411-414. Thus, FIG. 4 illustrates that a configurable core interface is generated by the ACPI framework 403 and is persistently stored in the ACPI framework 403.

According to some embodiments, the assignments 407 are made during the boot process by executing a general-purpose event of the ACPI 403 as known in the art. According to one illustrative embodiment, the core assignments 407 corresponding to each of the physical core indices 406 (0-3) are generated by use of a core permutation table 408 with each row corresponding to one of N factorial number of permutations of N number of cores in the processor 410. For example, the indices shown as core assignments 407 in FIG. 4 are "3," "2," "0," and "1" for the physical cores 406, which correspond to indices "0," "1," "2," and "3" of the cores 411-414. New core assignments 407 are generated each time the device 400 is re-booted or each time the ACPI framework 403 is initialized or modified.

As an example, during the boot process, a row index 409 is obtained such as from a persistent memory register 405. The row index 409 corresponds to one of the rows in the core permutation table 408. The permutation table 408 includes a series of rows, one row for each permutation of indices of the cores 411-414. According to one embodiment, the permutation table 408 is an ACPI table that is persistently stored in the boot memory 402 even when power is no longer provided to the motherboard 401. According to another embodiment, the permutation table 408 is generated each time the motherboard 401 of the device 400 is booted where the permutation table 408 is generated based on an answer of a query asking for a number of cores in the processor 410. The query is executed as AML byte code during the boot process. The row index 409 is persistently stored from boot to boot. During any given boot process, the row index 409 is advanced one, and the core assignments 407 are then generated by reference to a row in the permutation table 408 that corresponds to the new row index 409. As another example implementation, the row index 409 is selected based on a random or pseudo-random algorithm operative as AML byte code in the ACPI framework 403. In this way, each of the cores 411-414 receives processes for execution based on its corresponding core assignment 407.

Other mechanisms for generating the core assignments 407 are possible. As another example of a mechanism for generating core assignments 407, a random number generator algorithm programmed, compiled, and executed as AML byte code during the boot process assigns each of the core assignments 407 until all of the assignments are completed, one for each of the cores 411-414 of the processor 410.

Figure 5:
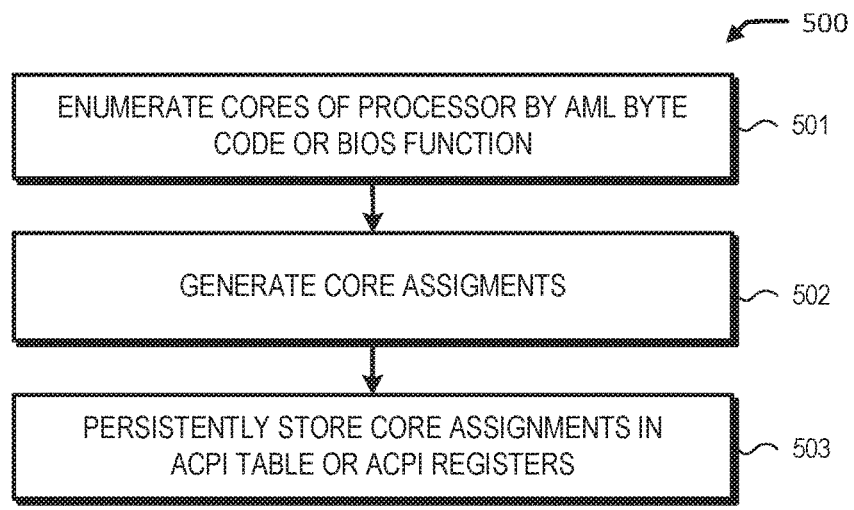
FIG. 5 is a flow diagram illustrating a method for assigning logical cores of a multi-core processor by way of ACPI persistent memory in accordance with some embodiments.

FIG. 5 is a flow diagram illustrating a method 500 for assigning logical cores of a multi-core processor by way of ACPI persistent memory in accordance with some embodiments. At block 501, cores of a processor are enumerated. Enumeration includes identifying a number of cores in the processor or in all processors in the computing device. According to other embodiments, enumeration includes obtaining an identifier, an address, a bus address, or a bus number for each of the cores to which an operating system sends processes for execution. The cores may be available by support of hyper-threading at physical cores thereby allowing execution of processor instructions at two or more cores or "processors" at each physical core. According to some embodiments, enumeration is performed by way of AML, byte code provided for this function. According to other embodiments, enumeration is performed by way of a BIOS function programmed and compiled into the BIOS for this purpose.

At block 502, core assignments for the enumerated cores are generated. According to some embodiments, one row of a plurality of rows of an assignment table is accessed and a new core index number is provided to each of the enumerated cores. For example, for a four-core processor where the cores are physically numbered 0, 1, 2, and 3, each of these four cores is provided with a new index number. As shown at 407 in FIG. 4, one example of new core index numbers is: "3" for a first physical core 411, "2" for a second physical core 412, "0" for a third physical core 413, and "1" for a fourth physical core 414. According to some embodiments, core assignments are performed by way of AML byte code provided for this function. According to other embodiments, core assignments are performed by way of a BIOS function programmed and compiled into the BIOS for this purpose.

At block 503, the method 500 includes persistently storing core assignments for use in passing processes to processor cores. For example, persistently storing includes storing an address (e.g., a bus address, a bus number) or identifier of each of the processor cores in the persistent boot memory such as in the ACPI table or ACPI registers 405 of FIG. 4. As another example, persistently storing includes storing a row index of a permutation table (in the form of an ACPI table). When core indices or core assignments are needed, the stored row index is used to point to identify the core assignments for each of the respective cores of the processor. According to some embodiments, persistently storing the core assignments is performed by way of AML byte code provided for this function. According to other embodiments, persistently storing the core assignments is performed by way of a BIOS function programmed and compiled into the BIOS for this purpose.

Figure 6:
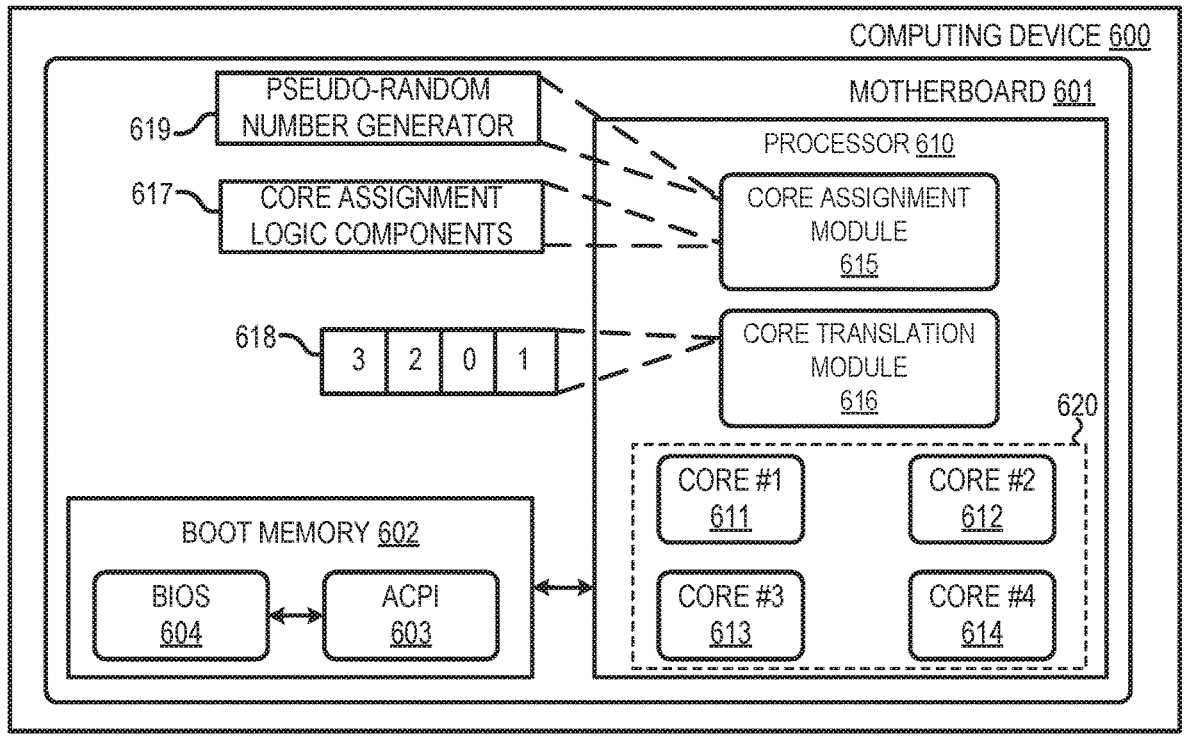
FIG. 6 is a block diagram of a computing device having a multi-core processor that designates core assignments to an operating system according to some embodiments.

FIG. 6 is a block diagram of a computing device having a multi-core processor that designates core assignments to an operating system according to some embodiments. A computing device 600 includes a motherboard 601 for operating various hardware elements. Some elements of a general processing device are omitted from FIG. 6 for sake of ease in illustration such as a system memory (e.g., ROM) and a hard drive. The motherboard 601 operates a boot memory 602, and a multi-core processor 610. The boot memory 602 includes a persistent boot memory such as an ACPI persistent memory or a BIOS CMOS memory. The boot memory 602 includes an ACPI framework 603 and a BIOS 604 that allows an OS of the computing device 600 to use the processor 610. The ACPI framework 603 includes an ACPI persistent memory that can store values for operation of the components of the computing device 600.

According to some embodiments, the processor 610 is a CPU and includes a plurality of cores including a first core 611, a second core 612, a third core 613, and a fourth core 614. One of the cores 611-614 is designated a default core C(0). The cores 611-614 include their own respective memory structures and may share a shared memory (e.g., an L3 cache) where such memory structures are not depicted in FIG. 6 for ease of illustration. The cores 611-614 form a first cluster 620 of cores. The processor 610 can have other clusters of cores.

The processor 610 also includes a core assignment module 615 and a core translation module 616. These modules 615, 616 are designed and operate according to one of a plurality of core assignment schemes. Two core assignment schemes are described herein as illustrative of the plurality of schemes to structure components of the processor 610. The components shuffle the designations of the cores 611-614 of the processor 610, and the components provide an interface to allow the cores to interoperate with other components of the device 600 including an OS.

According to some embodiments, and as one example scheme, during a processor configuration or initialization process (e.g., during the boot process), the core assignment module 615 configures the core translation module 616 using core assignment components 617 by providing core indices 618 (e.g., in the form of core indices, core addresses, or bus numbers) to the core translation module 616. After the boot process, during operation of the computing device 600, the OS routes process instructions as in a conventional scheduling mechanism by reference to a same set of bus numbers for the processor 610 as if no bus numbers had been changed at a bus of the processor 610. The OS interoperates with the ACPI framework 603 in a conventional way. However, based on core assignment components 617 operative during the boot process internal to the processor 610, process instructions coming from the OS are routed to the cores 611-614 based on the indices 618 of the core translation module 616. The processor 610 routes, via the core translation module 616, the instructions to the cores 611-614 internally according to a particular core index scheme represented as the core indices 618. Each time the processor 610 is initialized, an order or a sequence of these core indices 618 are changed. For example, a first process that is scheduled to be executed on the default core C(0) actually is passed to the core addressed in the first core index 618 which is "3" in FIG. 6. This process is repeated for each process passed to the processor 610 for execution at one of the cores 611-614. From the perspective of the OS, nothing has changed since the process instructions are executed at one of the cores 611-614 of the processor 610 and results are returned to operating memory and the OS. From the perspective of the processor 610, the processor instructions are spread around to the various cores 611-614 in a more even manner over the life of the processor 610.

According to some embodiments, the processor 610 or the core assignment module 615 of the processor 610 includes a pseudo-random number generator (PRNG) 619 or components to implement core index number generation. The core assignment module 615 can call or activate the PRNG 619 to provide an index value to put within each register thereby providing the indices 618 according to a pseudo-random scheme. Core assignment components 617 can be provided so as to check to ensure that no illegal indices 618 are provided (e.g., a value of "5" when only 0-3 are possible for the four cores 611-614 of the processor 610). Alternatively, the core assignment module 615 can call or activate the PRNG 619 to select which register is to be designated as the default core C(0). Then, an address or a core bus number is provided to that particular register in the processor 610. This process can be repeated until all cores 611-614 have been assigned an index 618.

Alternatively, once a C(0) register has been identified and filled, the other registers can be filled in order without regard to any randomness so that at least the C(0) is selected pseudo-randomly for the processor 610. According to some embodiments, the motherboard 601 includes a real-time clock (RTC) that operates therein, and the PRNG 619 communicates with the RTC when providing the core indices 618 to the registers of the core translation module, the PRNG 619 basing its operations upon a value of the RTC. According to such an embodiment, the PRNG 619 uses the RTC to obtain entropy for distributing at least the C(0) designation to one of the registers corresponding to one of the cores 611-614.

According to a variation of this example scheme, during a processor configuration process, the core assignment module 615 configures the registers of the core translation module 616 using core assignment components 617 according to a round robin scheme. As used herein, the round robin scheme shifts a core index of each core by one position during a processor initialization step of the boot sequence. The positions are shifted each time the device operating the processor is subjected to a boot process or each time the processor 610 detects a reassignment signal at a bus of the processor 610.

As one example of operation, when the processor 610 detects a reassignment signal, core assignment components 617 pseudo-randomly select a first register and a second register of the set of registers holding the indices 618. The core assignment components 617 then switch the indices 618 of the first selected register and the second selected register. A reassignment signal can be sent by a scheduler of a kernel of an OS active in the device 600 after a predetermined core wear target time is exceeded, the predetermined core wear target time having been designated by a manufacturer or an OS programmer according to a typical lifespan estimate for the cores 611-614. By way of example, a core wear target time can be predetermined and can be set as a number of hours or days operating in a particular core assignment configuration.

According to other embodiments, and as another example scheme, during a processor configuration or initialization process (e.g., during the boot process), the core assignment module 615 configures ACPI registers or an ACPI table of the ACPI framework 603 (corresponding to the cores 611-614 of the processor 610) using core assignment components 617 by providing core indices 618, (e.g., in the form of indices, core addresses, or bus numbers) to the ACPI framework 603. According to some embodiments, the core indices 618 correspond to bus numbers (e.g., 0x4C, 0x10) for the cores 611-614. As one example of an implementation, the core assignment module 615 reads core indices 618 from the core translation module 616 and passes the indices 618 to the ACPI framework 603. According to another example implementation, the core translation module 616 includes a table of permutations of sets of core indices 618 or values that can be used in subsequent configuration or initialization steps. During an initialization step in the processor 610, the core assignment module 615 randomly selects, via the core assignment components 617, one of the rows from the table of permutations of sets of core indices 618 and passes the indices 618 to the ACPI framework 603.

In operation, according to the second example scheme, process instructions are routed from the OS via the information provided to the ACPI framework 603 by the core assignment module 615. The scheduler and the kernel of the OS of the computing device 600 operate using conventional core calls and core scheduling, but transparently the instructions are routed to one of the various cores 611-614 indicated by the core indices 618 and not by hard-wired designations as in conventional operation. For example, a first process that is scheduled to be executed on C(0) actually is passed to the core addressed in the first index which is "3" in FIG. 6. This method is repeated for each process that is passed to the processor 610 for execution. In this way, the first core 611 that was permanently hardwired or configured as C(0) in a conventional system is transformed into C(3), and the process that was assigned to be executed on C(0) is actually sent to C(3).

This scheme of scheduling is repeated using the core assignments 607 until the core assignments 607 are re-generated from time to time. Core re-assignment is performed at each reboot or on demand from time to time as scheduled or triggered from the OS or by some other component or combination of components in the computer device 600. In summary, as explained in relation to FIG. 6, from the perspective of the OS scheduler, each process is executed on one of C(0), C(1), C(2), and C(3), and in actuality, each process is transparently passed to and executed on a core designated by the core indices 618. The core indices 618, the core translation module 616, and the core assignment module 615 are part of a configurable interface between the OS and the processor cores 611-614. FIG. 6 illustrates that a configurable core interface can exist between an OS and the cores 611-614 of the processor 610. From the perspective of the OS, nothing has changed since the process instructions are successfully executed and results are returned to memory for access by the OS. From the perspective of the processor 610, the processor instructions are spread around to the various cores 611-614 in a more even manner over the life of the processor 610.

According to another embodiment, as another example scheme, during a processor configuration or initialization process (e.g., during the boot process), a first core assignment is provided by a core assignment module of a first processor (e.g., an ARM processor) and its core assignment output is provided to a second processor such as processor 610 of FIG. 6. In this embodiment, the second processor is of a same or a different processor type such as a second processor configured to use a different instruction set (e.g., x86 instruction set) than the first processor. In this embodiment, during a first or early execution of a BIOS sequence, the first processor is instructed to use a core translation module of the first processor and to use the cores of the first processor according to the translation scheme until the first processor is no longer needed or in use. Later, during a second or late execution of the BIOS sequence, the BIOS operative in a memory or the first processor instructs the first processor to use its core translation module and to provide a second or further core assignment to the second processor—a second core re-assignment. The second processor includes storage registers for receiving and holding its new core assignments (e.g., in the form of core indices, core addresses, or bus numbers). Alternatively, the first processor provides the new core assignments to an operating system (OS) for the second processor. In this way, the second processor has its cores re-numbered for the purpose of having the OS assign processes to the cores of the second processor.

Figure 7:
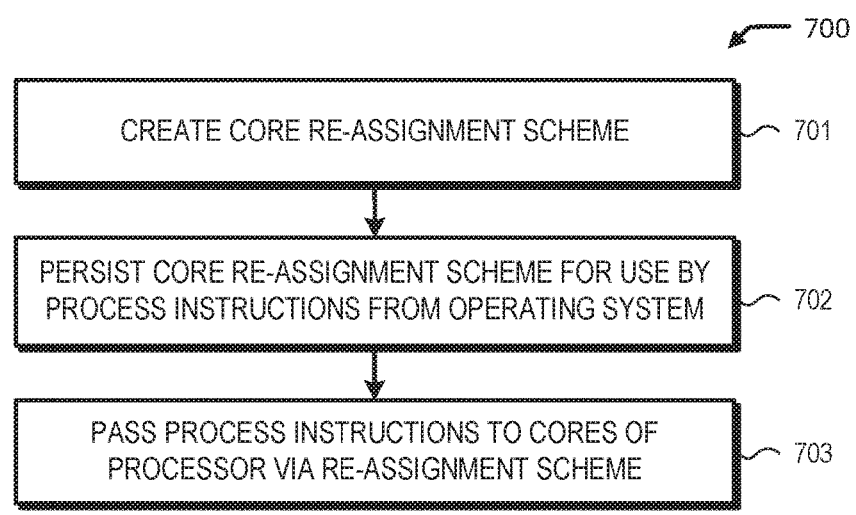
FIG. 7 is a flow diagram illustrating a method for a multi-core processor to designate cores of a multi-core processor in accordance with some embodiments.

FIG. 7 is a flow diagram illustrating a method for designating cores of a multi-core processor by a processor in accordance with some embodiments. At block 701, a core re-assignment scheme is created. The re-assignment scheme uses the number of cores in the processor or in all processors in the computing device to randomly or pseudo-randomly provide a new index number to each of the available cores. This scheme can be described as a pseudo-random assignment scheme. This scheme may include obtaining an identifier, an address, a bus address, or a bus number for each of the cores to which an operating system sends processes for execution. According to some embodiments, this re-assignment scheme is created by logic or a sequence of steps executed by portions of a processor such as in the processor 610 of FIG. 6. According to certain embodiments, the cores are cores of a multi-core CPU or a multi-core GPU, and a re-assignment scheme is applied to each multi-core processor in the device.

At block 702, the core re-assignment scheme created at block 701 is persistently stored. Storing may take the form of passing addresses such as bus addresses to another element in a computing device such as a boot memory, a memory structure of an ACPI framework, or a system RAM.

At block 703, process instructions for execution on the cores of a processor are passed to one of the respective cores based on the re-assignment scheme. For example, as shown at 618, a process that is scheduled and passed to core C(0) is actually sent to C(3), or to whichever core C(0) is re-assigned.

Figure 8:
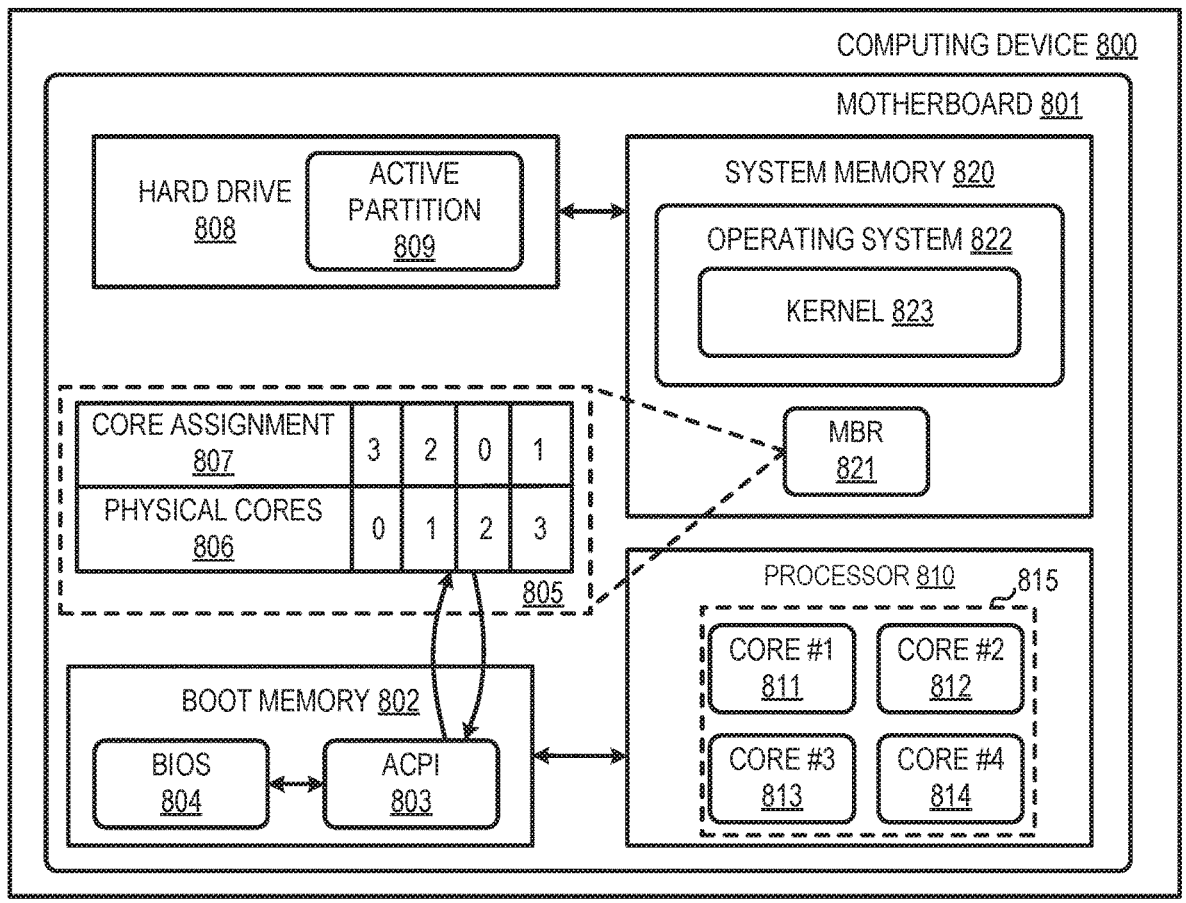
FIG. 8 is a block diagram of a computing device for designating cores of a multi-core processor by one or more boot components according to some embodiments.

FIG. 8 is a block diagram of a computing device for designating cores of a multi-core processor by one or more boot components according to some embodiments. A computing device 800 includes a motherboard 801 for operating various hardware elements. The motherboard 801 operates various components including a boot memory 802, a storage memory such as a hard drive 808, a multi-core processor 810, and a system memory 820. The hard drive 808 includes an active partition 809 with instructions therein.

According to some embodiments, the processor 810 includes a plurality of cores including a first core 811, a second core 812, a third core 813, and a fourth core 814. The cores 811-814 include their own respective memory structures and share a shared memory (e.g., an L3 cache) where such memory structures are not depicted in FIG. 8 for sake of ease in illustration. The cores 811-814 form a first cluster 815 of cores. The processor 810 can have other clusters of cores and cores of any other clusters of a same or a different socket are treated similarly to those of the first cluster 815.

The boot memory 802 includes an ACPI framework 803 and a BIOS 804 that allows an OS of the computing device 800 to provide processes to the cores 811-814 of the processor 810 for execution thereon. The ACPI framework 803 includes an ACPI memory within or as part of the boot memory 802. The ACPI memory stores values for operation of the components of the computing device 800. According to some embodiments, an ACPI memory takes the form of an ACPI table, a group of ACPI registers, or a set of ACPI registers as known to those in the art. During a boot process, the processor 810 is declared in an ACPI namespace of the ACPI framework 803. The ACPI namespace includes ACPI tables for operating the components of the motherboard 801 including the processor 810 and its cores 811-814. During its initialization, an OS of the computing device 800 builds a namespace for itself from the ACPI tables. A device definition for the processor 810 is declared in the OS of the computing device 800 using a hardware identifier which the OS uses to schedule processes to execute on the cores 811-814 of the processor 810.

The OS uses information in the set of ACPI registers to schedule processes on the cores 811-814 of the processor 810. The ACPI framework 803 includes registers for each of the cores 811-814 of the processor 810 in the form of core assignments 807. According to some embodiments, the core assignments 807 correspond to bus numbers (e.g., 0x4C, 0x10) for the cores 811-814, but are represented as indices in FIG. 8 for convenience since bus numbers vary according to an architecture and a layout of components of the processor 810. As the OS 822 operates and executes processes, a kernel 823 of the OS 822 schedules the processes based on its conventional core indices 0 to N−1. The indices of an OS scheduler of the kernel 823 correspond to the core indices

806 in FIG. 8 (e.g., execute process having PID 0123 execute on core (2) of processor having processor index (0)). However, as part of a configurable interface between the OS and processor 810, the core assignments 807 allow scheduled processes to be passed to the cores 811-814 according to the core assignments 807, and not according to conventional core numbering and static bus numbers.

For example, a process that is scheduled to be executed at core index (0) at 806 (i.e., the default core C(0)) is actually passed to the core having index (3) at 807 (i.e., fourth core C(3)). In this way, the first core 811 that was originally and permanently hardwired or configured as the default core C(0) in a conventional system has been transformed into the fourth core C(3), and the process that was assigned to be executed on the first core 811 is actually sent to the fourth core 814. This scheduling is repeated using all of the respective core assignments 807 until the core assignments 807 are re-generated. From the perspective of the OS scheduler, the process is executed on the default core C(0), and in actuality, the process is transparently passed to and executed on the fourth core 814 or C(3). Thus, processes are passed to the respective core 811-814 corresponding to the indices of the core assignments 807 thereby creating a configurable interface between the OS and the processor cores 811-814. In short, FIG. 8 illustrates that a configurable core interface is persistently stored in the ACPI 803.

According to some embodiments, the core assignments 807 are made during the boot process by boot components during execution of a master boot record (MBR) 821. Before the MBR 821 is executed, certain BIOS instructions are executed from the boot memory 802. The BIOS 804 eventually activates the boot loader of the MBR 821 and the BIOS 804 stops directly controlling the motherboard 801 and the device 800. The MBR 821 includes a boot loader for the OS 822. The boot loader executes a bootstrap thread (e.g., a thread (0) in core (0) of processor (0)) that starts up fetching code. The fetching code pulls additional instructions from a first sector of the active partition 809 of the hard drive 808 starting from a particular address. The additional instructions include instructions to make the core assignments 807. The additional instructions also include instructions for loading the OS into the system memory 820 and initializing the OS 822 after the core assignments have been made.

Thus, according to some embodiments, the core assignments 807 are made prior to loading some or all of the OS 822 and operating the same. Once initialized, the instructions of the boot loader start the OS 822 by placing the OS 822 into a condition to execute user-defined instructions on the computing device 800. During its initialization, the OS 822 starts and initializes a kernel 823. The kernel 823 provides process instructions to the processor cores 811-814 using the core assignments 807.

With respect to FIG. 8, the core assignments 807 are generated by instructions of the ACPI 803, the boot loader, the MBR 821, the OS 822, or a combination of the same. According to one illustrative embodiment, the core assignments 807 are provided by instructions triggered by execution of instructions of the boot loader after the BIOS 804 stops controlling the motherboard 801. According to some embodiments, the instructions operative in the system memory 820 read physical core addresses (e.g., bus numbers) from ACPI registers of the ACPI framework 803 in the boot memory 802 as represented by the core indices 806. The instructions determine a set of core assignments 807, one for each of the physical cores 811-814 indicated as core indices 806 (numbered 0-3) in the registers 805 according to one of a plurality of available assignment schemes. As illustrated in FIG. 8, the registers 805 are in the system memory 820 as part of the MBR 821. Subsequent instructions use information in the registers 805 to generate the core assignments.

The instructions to determine the core assignments 807 take one of a plurality of forms. For example, the instructions make use of a core permutation table with each row corresponding to one of N factorial number of permutations of N number of cores in the processor 810. The number of cores may be determined during the boot process by instructions of the MBR 821 or the boot loader of the MBR 821 by reading one or more registers of the ACPI framework 803 during the boot process. As another example, the instructions of the MBR 821 include a random number generator algorithm that is called to make some or all of the core assignments 807. According to a first variation, a first random or pseudo-random assignment for the default core C(0) is made among the available cores 811-814. Subsequently, each of the other cores is sequentially assigned in bus order to make the remaining core assignments 807. According to a second variation for making core assignments 807, each of the cores (C(0) through C(3)) are randomly or pseudo-randomly assigned. The instructions for making the core assignments 807 includes persisting or otherwise making the assignments 807 available to the kernel 823 of the OS 822. One mechanism to do so includes executing instructions to write or re-rewrite certain registers, or one or more ACPI table entries in one or more respective ACPI tables, of the ACPI framework 803. According to some embodiments, the MBR 821 includes instructions to persist the core assignments 807.

Figure 9:
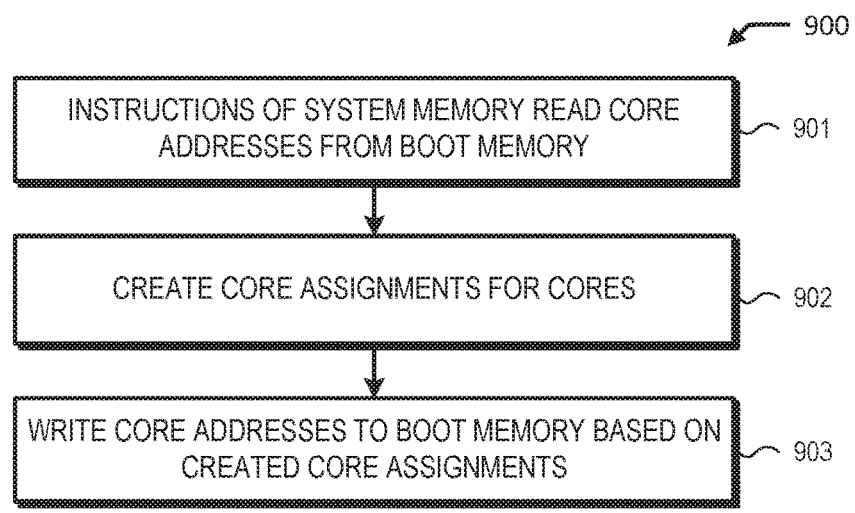
FIG. 9 is a flow diagram illustrating a method for designating cores of a multi-core processor by a boot loader in accordance with some embodiments.

FIG. 9 is a flow diagram illustrating a method 900 for designating cores of a multi-core processor by boot loader instructions, master boot record instructions, kernel instructions, OS instructions, or a combination of the same in accordance with some embodiments. At block 901, instructions in a system memory read core addresses of a processor from a boot memory. For example, boot loader instructions read bus numbers from a group of ACPI registers corresponding to a set of cores of a multi-core processor. At block 902, core assignments are made for each core of the set of cores of the multi-core processor. Core assignments are made according to one of a variety of ways described in relation to other figures. At block 903, based on core assignments, core addresses are written to memory such as to a boot memory. The newly created core assignments are then used by a scheduler of a kernel of an operating system when scheduling processes for execution. According to some embodiments, using this method 900 allows an operating system to execute processes in a conventional manner without substantially altering the configuration, programming, or execution of the operating system, and extends a life of a multi-core processor by aging all of the cores approximately equally by assigning at least a default core C(0) as a first core designation to each of the cores of the multi-core processor in turn over the life of the multi-core processor.

In some embodiments, the apparatus and techniques described above are implemented in a device or a system including one or more integrated circuit (IC) devices (also referred to as integrated circuit packages or microchips), such as the multi-core processors described above with reference to FIGS. 1-9. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor comprising:
   a plurality of processor cores accessible based on a plurality of changeable core indices;
   a core translation component having a set of registers, wherein each register is associated with a corresponding processor core of the plurality of processor cores; and
   a core assignment component configured to:
      assign a core index of the plurality of changeable core indices to each register of the set of registers of the core translation component according to a core assignment scheme during processor initialization when the processor is powered on during a boot process, the core assignment component configured to route processor instructions to a respective processor core based on a respective assigned core index, wherein:
         a processor core of the plurality of processor cores is assigned at random from among the plurality of processor cores for the processor as a default core for execution of processes by the processor; and
         remaining processor cores of the plurality of processor cores are assigned to the set of registers based on a bus order in the processor during the boot process as the remaining processor cores become active through the boot process.

2. The processor of claim 1, wherein each core index provided to a respective registers of the set of registers is a bus number of a respective core of the plurality of processor cores.

3. The processor of claim 1, wherein:
   at least two of the processor cores are coupled as a cluster of cores; and
   the core assignment scheme provides respective core indices for at least the two of the processor cores of the cluster of cores based on the cluster coupling such that only core indices of the cluster are rearranged relative to one another.

4. The processor of claim 1, wherein:
   the core assignment component includes a pseudo-random number generator (PRNG) based on operation of a real-time clock operatively associated with a motherboard supporting the processor to provide the plurality of changeable core indices to the set of registers of the core translation component.

5. The processor of claim 4, wherein the PRNG communicates with a motherboard having a real-time clock (RTC)

when providing the plurality of changeable core indices to the set of registers of the core translation component.

6. The processor of claim 1, wherein the core assignment component is configured to:
identify a row of a table of permutations of orders of the processor cores of the plurality of processor cores, wherein the row of the table is the core assignment scheme for the default core assigned at random.

7. A processor, comprising:
a plurality of processor cores;
a first register for a default processor core of the plurality of processor cores; and
a core assignment component to:
pseudo-randomly assign a bus number of a processor core from among the plurality of processor cores to the first register during a boot process, the first register designated as the default processor core of the processor for scheduling execution of processes by the processor by a scheduler of an operating system; and
assign bus numbers of remaining processor cores, based on a bus order in the processor during the boot process as the remaining processor cores become active through the boot process, to the scheduler of the operating system that provides the processor instructions to the processor, wherein the processor receives routes the processor instructions to the plurality of processor cores based on the assigned bus numbers.

8. The processor of claim 7, wherein the pseudo-randomly assigned bus number of the processor core is provided based on a real-time clock (RTC) value acquired by the processor during the boot process.

9. The processor of claim 7, wherein the core assignment component is further to:
detect a reassignment signal at a bus of the processor;
pseudo-randomly select the first register of a set of registers in response to detecting the reassignment signal;
pseudo-randomly select a second register of the set of registers in response to detecting the reassignment signal;
switch the bus number of the first selected register to the second selected register after the first register and the second register are selected; and
switch the bus number of the second selected register to the first selected register after the first register and the second register are selected.

10. The processor of claim 9, wherein the reassignment signal is generated by the scheduler of the operating system providing the processor instructions to the processor, wherein the reassignment signal is sent after a predetermined core wear target time.

11. A method comprising:
assigning an index to each core of a plurality of cores of a processor according to a core assignment scheme, by:
assigning at random a core of the plurality of cores from among the plurality of cores of the processor as a default core for execution of processes by the processor; and
assigning remaining cores of the plurality of cores based on a bus order in the processor during a boot process as the assigned remaining cores become active through the boot process; and
routing processor instructions received at the processor with a core bus number from an operating system to a respective core in the processor based on its assigned index.

12. The method of claim 11, wherein the core assignment scheme is a round robin scheme whereby the default core is shifted one core during a processor initialization step of the boot process.

13. The method of claim 11, wherein each core index is a bus number of another core.

14. The method of claim 11, wherein:
at least two of the cores of the plurality of cores are coupled as a cluster of cores; and
the core assignment scheme provides respective core indices for at least two of the cores of the cluster based on the cluster coupling such that only core indices of the at least two of the cores of the cluster are rearranged relative to one another.

15. The method of claim 11, wherein the assignment scheme is based on values in a row of a table of permutations of orders of the plurality of cores.

* * * * *

UNITED STATES PATENT AND TRADEMARK OFFICE
CERTIFICATE OF CORRECTION

| | |
|---|---|
| PATENT NO. | : 10,915,330 B2 |
| APPLICATION NO. | : 15/846781 |
| DATED | : February 9, 2021 |
| INVENTOR(S) | : Amitabh Mehra and Krishna Sai Bernucho |

It is certified that error appears in the above-identified patent and that said Letters Patent is hereby corrected as shown below:

In the Claims

At Column 16 Line 48, please correct "to a respective registers" to be --to a respective register--

At Column 17 Line 28, please correct "receives routes the processor instructions" to be --routes the processor instructions--

Signed and Sealed this
Tenth Day of October, 2023

*Katherine Kelly Vidal*

Katherine Kelly Vidal
*Director of the United States Patent and Trademark Office*